US010037120B2

(12) United States Patent
Arizumi

(10) Patent No.: US 10,037,120 B2
(45) Date of Patent: Jul. 31, 2018

(54) IMAGE SUPPLY DEVICE, IMAGE DISPLAY SYSTEM, METHOD OF CONTROLLING IMAGE SUPPLY DEVICE, IMAGE DISPLAY DEVICE, AND RECORDING MEDIUM

(75) Inventor: Takeaki Arizumi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 462 days.

(21) Appl. No.: 14/001,741

(22) PCT Filed: Mar. 14, 2012

(86) PCT No.: PCT/JP2012/001793
§ 371 (c)(1),
(2), (4) Date: Aug. 27, 2013

(87) PCT Pub. No.: WO2012/124329
PCT Pub. Date: Sep. 20, 2012

(65) Prior Publication Data
US 2013/0328837 A1 Dec. 12, 2013

(30) Foreign Application Priority Data
Mar. 17, 2011 (JP) .................. 2011-059053

(51) Int. Cl.
G06F 3/048 (2013.01)
G06F 1/16 (2006.01)
(Continued)

(52) U.S. Cl.
CPC ............ *G06F 3/048* (2013.01); *G06F 1/1639* (2013.01); *G06F 3/017* (2013.01); *G06F 3/0425* (2013.01); *G06F 3/04883* (2013.01)

(58) Field of Classification Search
CPC .... G06F 3/048; G06F 3/04883; G06F 1/1639; G06F 3/017; G06F 3/0425
See application file for complete search history.

(56) References Cited

U.S. PATENT DOCUMENTS 6,339,431 B1 * 1/2002 Ohmori ................. G06F 3/0481
345/585
8,490,024 B2 * 7/2013 Harrison ............. G06F 17/5004
715/765
(Continued)

FOREIGN PATENT DOCUMENTS

EP 0 866 397 A1 9/1998
EP 1 351 123 A2 10/2003
JP A 2009-157448 7/2009

OTHER PUBLICATIONS

Jul. 30, 2012 Search Report issued in International Patent Application No. PCT/JP2012/001793.
(Continued)

Primary Examiner — Jose Soto Lopez
(74) Attorney, Agent, or Firm — Oliff PLC

(57) ABSTRACT

An image supply device used with an image display device and an operation detection device adapted to detect an indication location in accordance with a position indication operation on a display surface includes a drawing section adapted to generate a superimposition image to be displayed while being superimposed on an original image based on the indication location detected by the operation detection device, a first image generation section adapted to generate a first composite image by superimposing the superimposition image generated by the drawing section on the original image, a second image generation section for generating a second composite image by superimposing an operating image for instructing a process of the superimposition image generated by the drawing section on the first composite image in response to a change in the original image, and an output section adapted to output the second composite image to the image display device.

17 Claims, 7 Drawing Sheets

(51) Int. Cl.
*G06F 3/01* (2006.01)
*G06F 3/042* (2006.01)
*G06F 3/0488* (2013.01)

(56) References Cited

U.S. PATENT DOCUMENTS

| | | | | |
|---|---|---|---|---|
| 2002/0097247 | A1* | 7/2002 | Ohba | G06F 3/011 345/501 |
| 2003/0182630 | A1* | 9/2003 | Saund | G06F 3/04845 715/273 |
| 2004/0217947 | A1* | 11/2004 | Fitzmaurice | G06F 3/0481 345/183 |
| 2006/0168531 | A1* | 7/2006 | Sato | G06F 3/038 715/751 |
| 2006/0214947 | A1* | 9/2006 | Boose | G06T 11/206 345/619 |
| 2006/0267966 | A1* | 11/2006 | Grossman | G06F 3/0346 345/179 |
| 2007/0174761 | A1* | 7/2007 | Lin | G06F 17/241 715/205 |
| 2008/0111710 | A1* | 5/2008 | Boillot | G06F 3/017 341/22 |
| 2008/0119235 | A1* | 5/2008 | Nielsen | G06F 3/0483 455/566 |
| 2009/0079813 | A1* | 3/2009 | Hildreth | H04N 7/147 348/14.03 |
| 2009/0319894 | A1* | 12/2009 | Markiewicz | G06F 3/04883 715/702 |
| 2009/0322695 | A1* | 12/2009 | Cho | G06F 3/0416 345/173 |
| 2011/0007037 | A1* | 1/2011 | Ogawa | G06F 3/03545 345/179 |
| 2011/0018864 | A1* | 1/2011 | Ishibashi | G06F 3/011 345/419 |
| 2011/0107238 | A1* | 5/2011 | Liu | G06Q 10/101 715/756 |
| 2011/0141146 | A1* | 6/2011 | Bahg | G06F 3/0484 345/661 |
| 2011/0164029 | A1* | 7/2011 | King | G06F 3/04883 345/419 |
| 2012/0066640 | A1* | 3/2012 | Kwak | G06F 9/451 715/788 |
| 2012/0206339 | A1* | 8/2012 | Dahl | G06F 3/043 345/156 |
| 2012/0210200 | A1* | 8/2012 | Berger | G06F 3/0481 715/202 |
| 2012/0229590 | A1* | 9/2012 | Barrus | H04L 12/1822 348/14.08 |
| 2013/0283202 | A1* | 10/2013 | Zhou | G06F 3/0484 715/781 |
| 2014/0033013 | A1* | 1/2014 | Shaver | G06F 17/24 715/230 |
| 2014/0033015 | A1* | 1/2014 | Shaver | G06F 17/241 715/233 |

OTHER PUBLICATIONS

Jul. 30, 2012 Written Opinion issued in International Patent Application No. PCT/JP2012/001793.
Kurtenbach et al; "Contextual Animation of Gestural Commands;" Computer Graphics Forum; 1994; vol. 13; No. 5; pp. 305-314.

* cited by examiner

[Fig. 1]
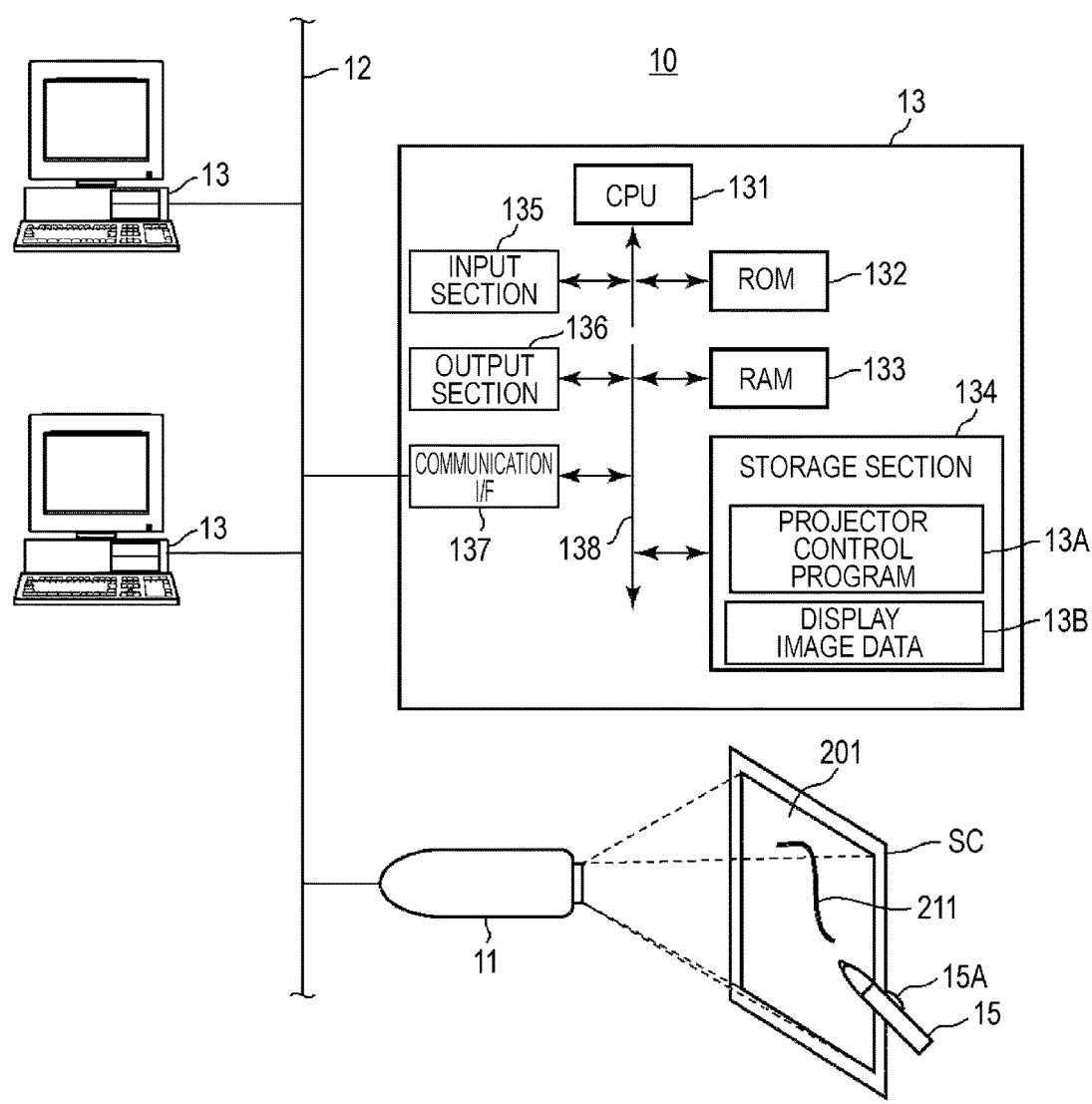

[Fig. 2]
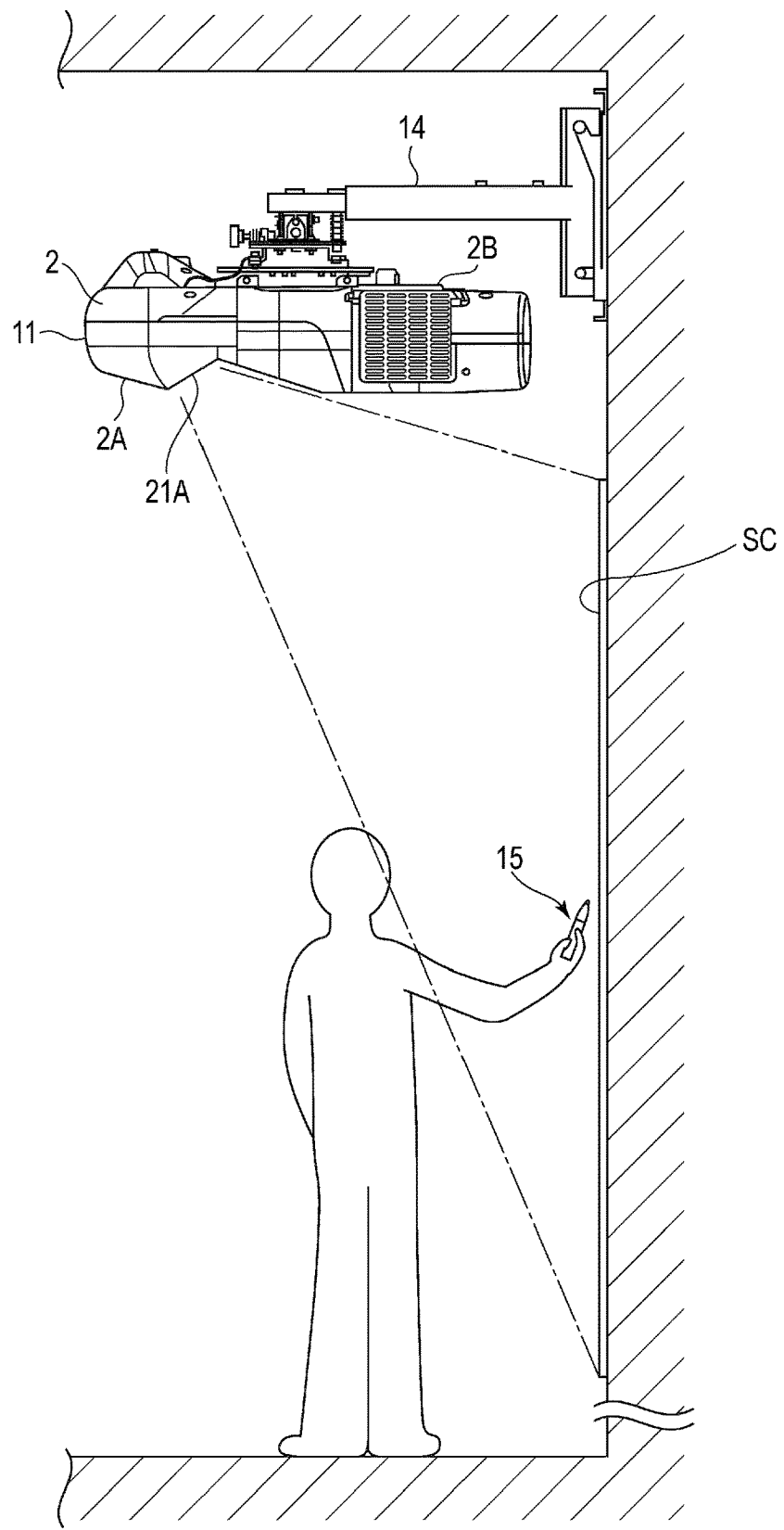

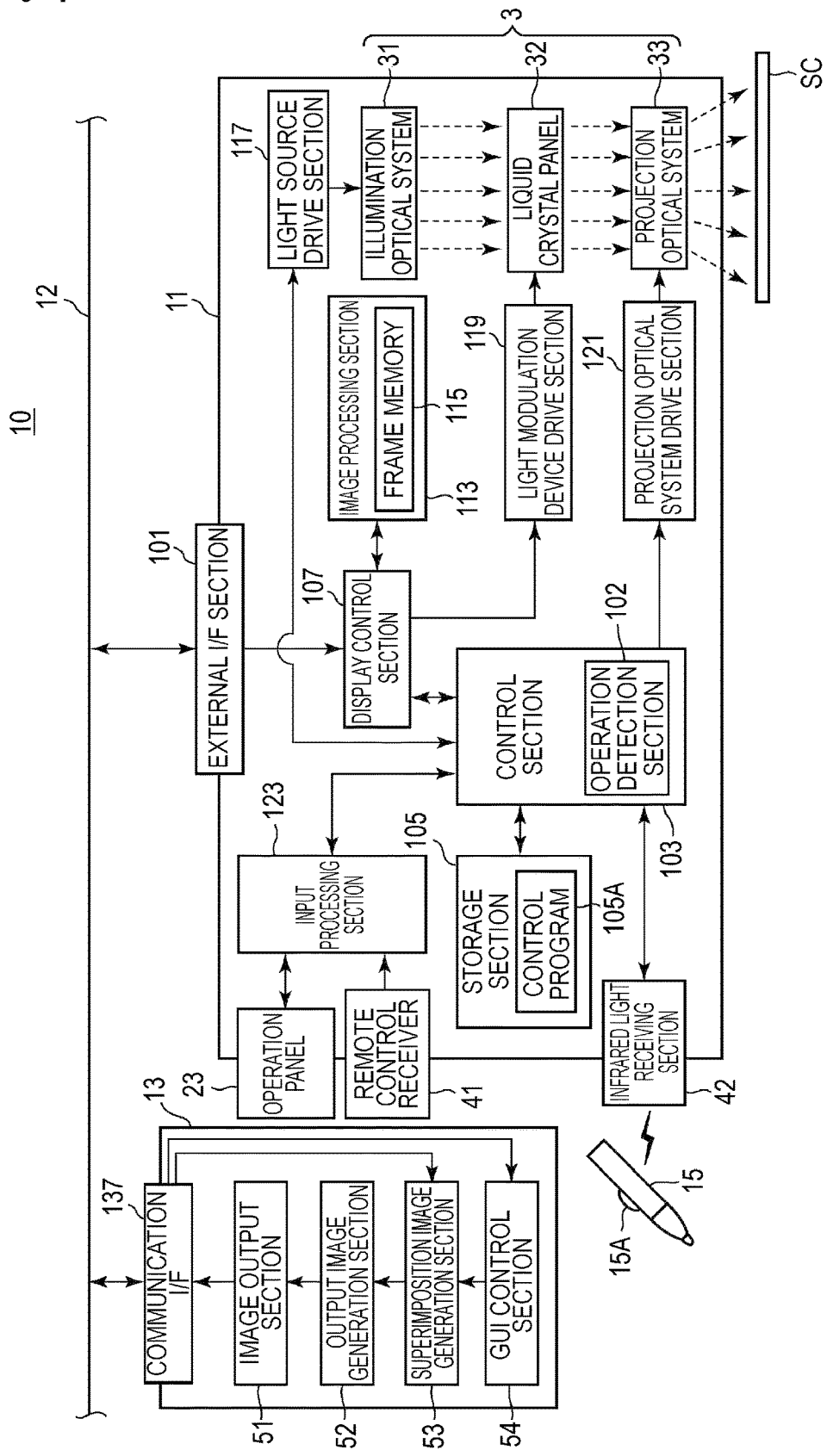
[Fig. 3]

[Fig. 4]
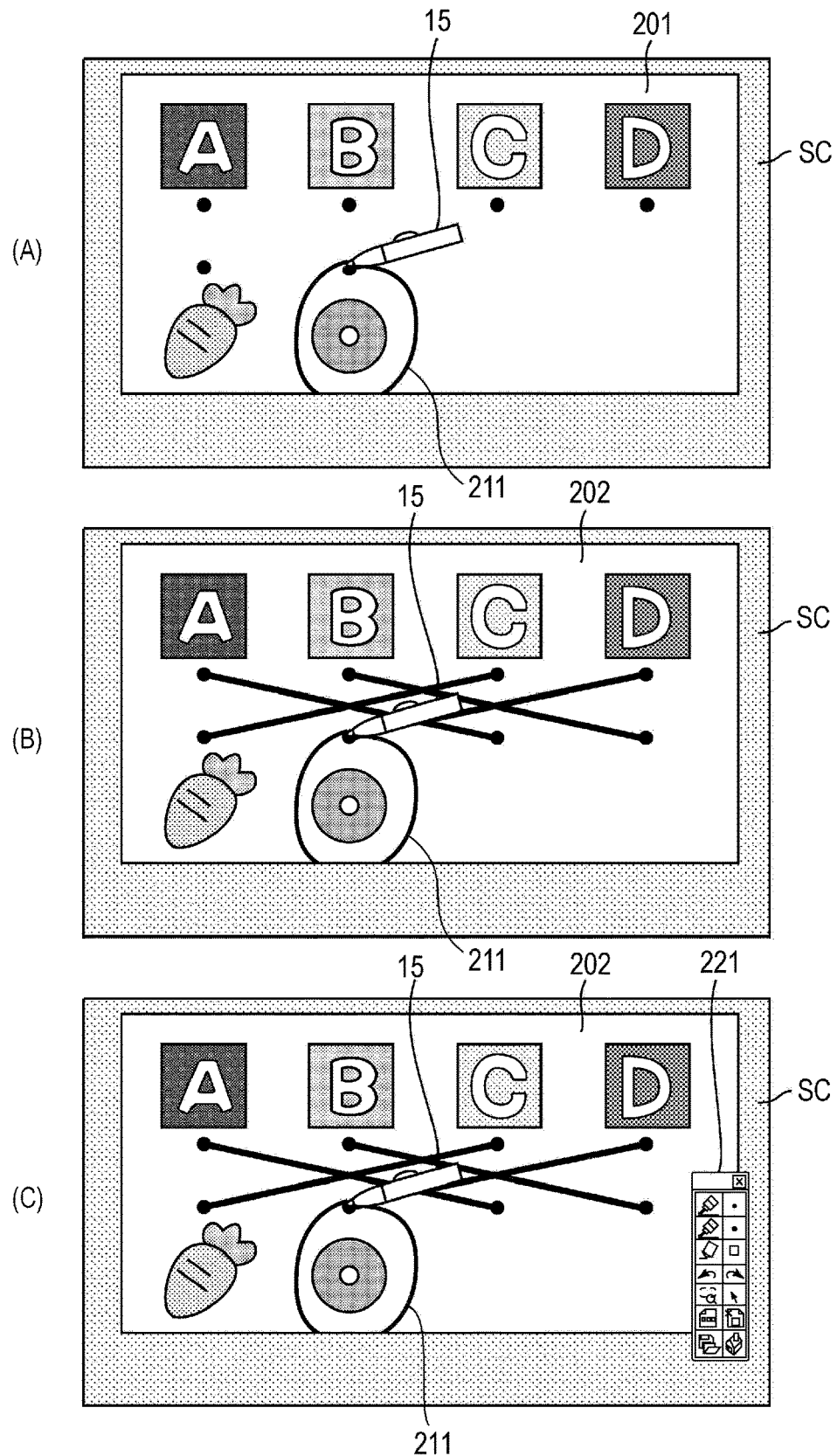

[Fig. 5]
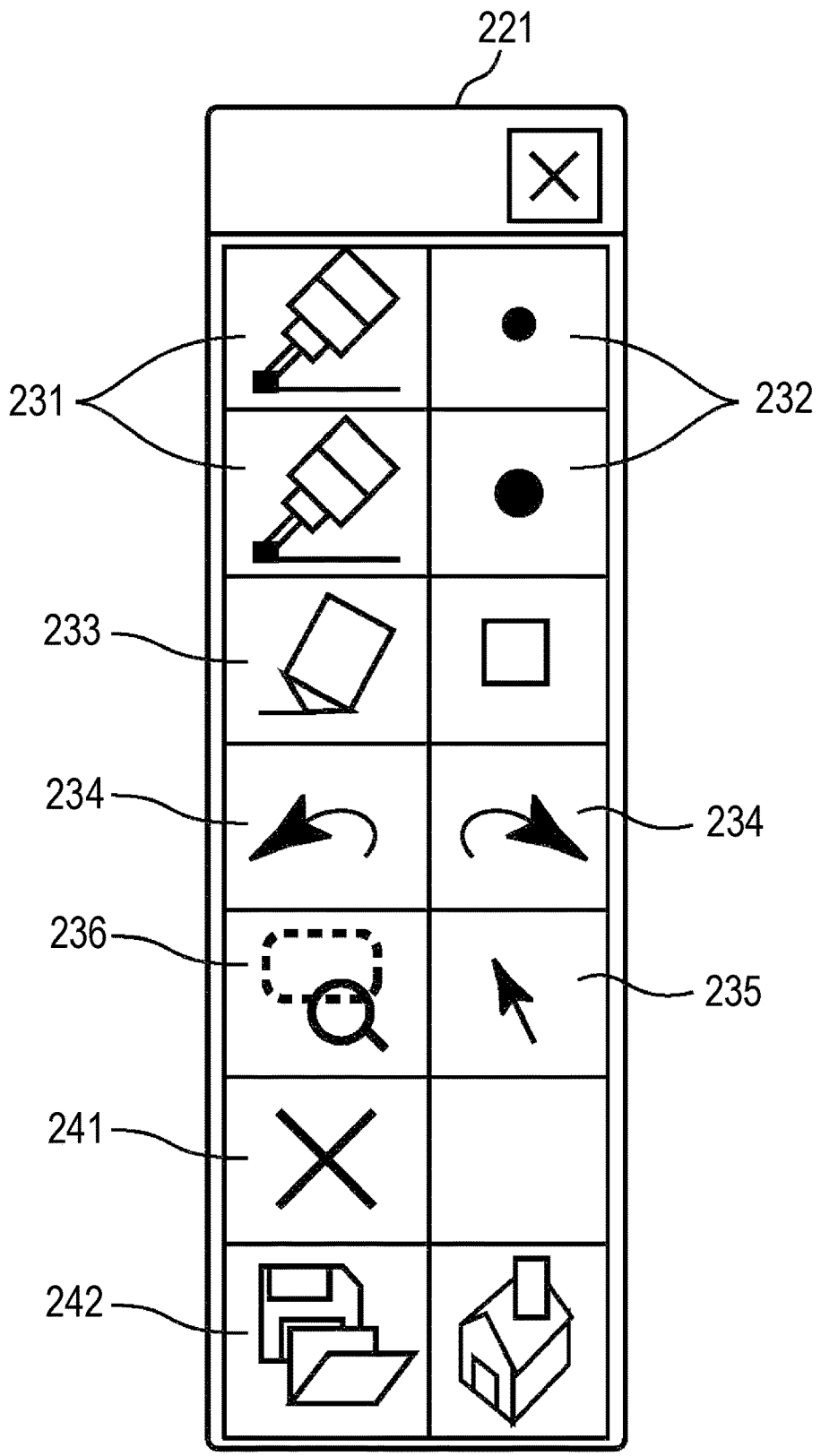

[Fig. 6]
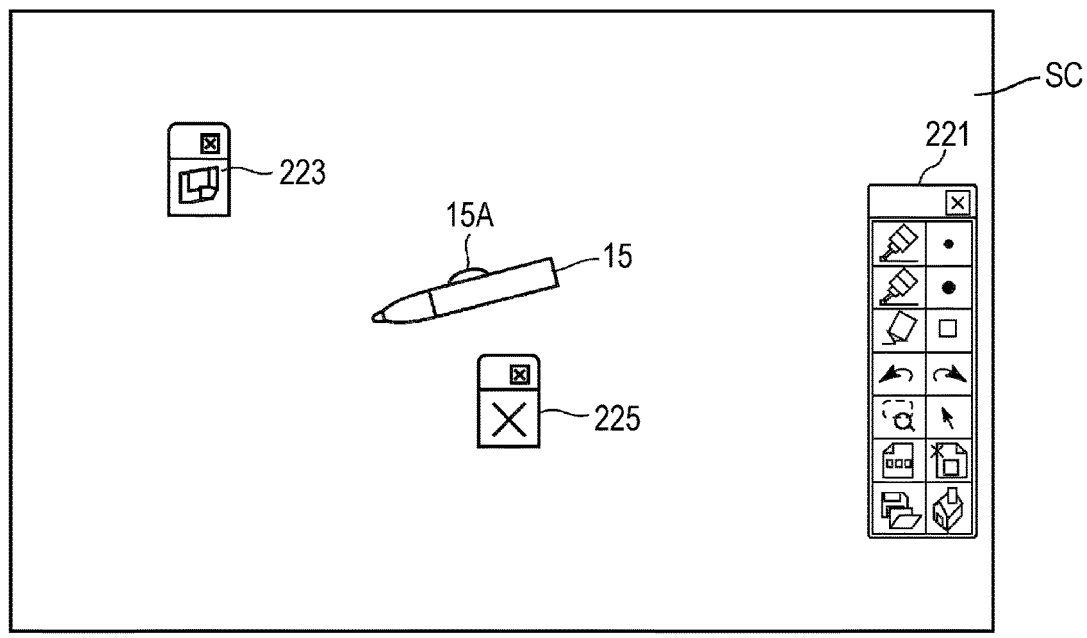

[Fig. 7]
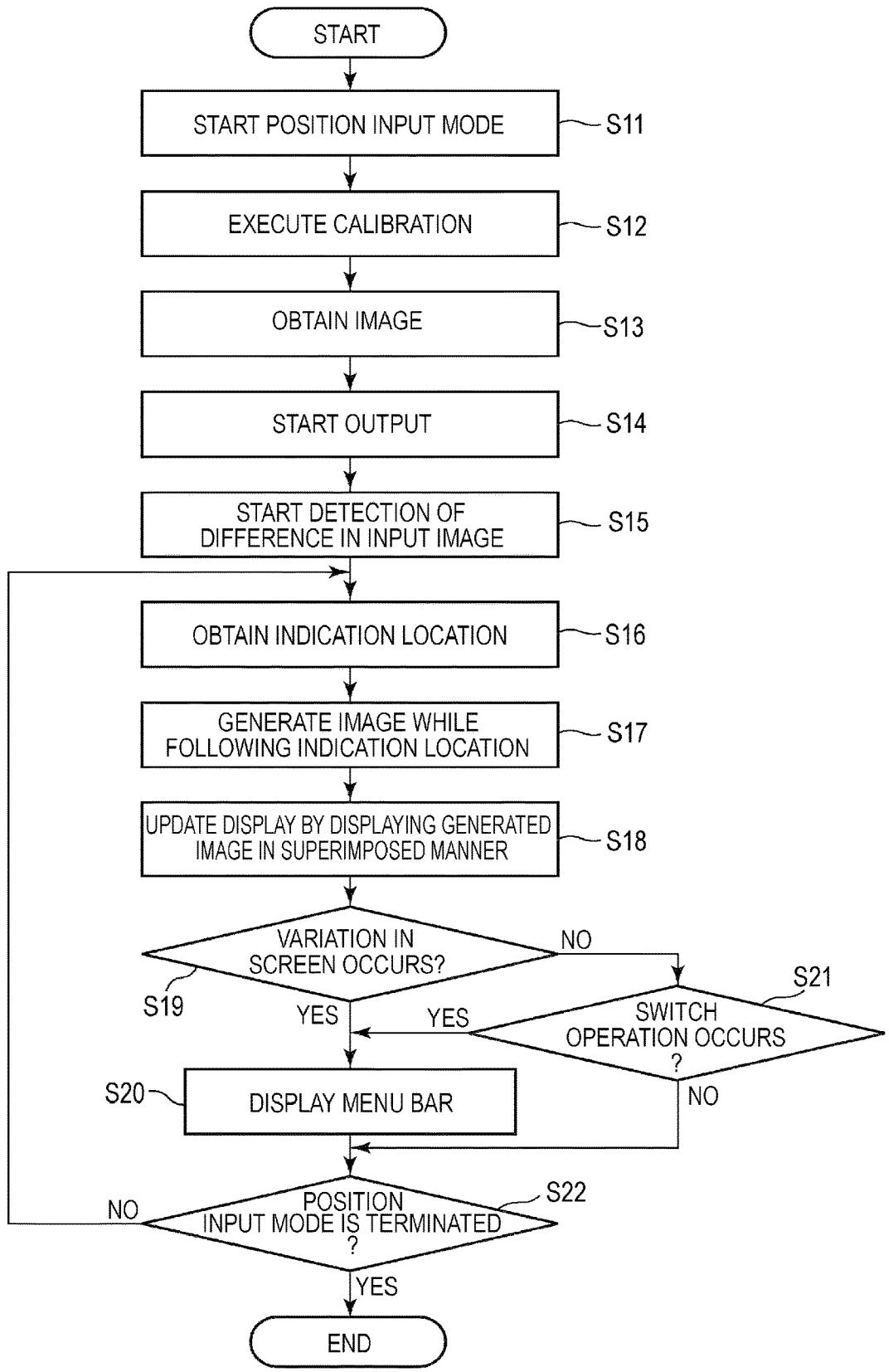

IMAGE SUPPLY DEVICE, IMAGE DISPLAY SYSTEM, METHOD OF CONTROLLING IMAGE SUPPLY DEVICE, IMAGE DISPLAY DEVICE, AND RECORDING MEDIUM

CROSS REFERENCE

The entire disclosure of Japanese Patent Application No. 2011-059053, filed Mar. 17, 2011 is expressly incorporated by reference herein.

TECHNICAL FIELD

The present invention relates to an image supply device for outputting an image to an image display device, an image display system, a method of controlling an image supply device, an image display device, and recording medium.

BACKGROUND ART

In the past, there has been known a system making it possible to perform handwriting input by performing an operation on a display surface with a coordinate input device such as a stylus (see, e.g., PTL1). In the case of performing drawing or instructing information processing using a coordinate input device as the system described in PTL1, a graphical user interface (GUI) using graphics for an operation such as a menu screen is adopted. In the system of PTL1, a menu screen as a graphics for operation is disposed on a display screen to thereby make it possible to process the information input by handwriting by operating the menu screen.

CITATION LIST

Patent Literature

PTL 1: JP-A-2009-157448

SUMMARY OF INVENTION

Technical Problem

Incidentally, if the graphics for an operation such as a menu screen is displayed, the operation such as drawing becomes unachievable at the display location thereof, and therefore, if the graphics for an operation is unnecessarily displayed, the operability might be damaged. On the other hand, it can be a factor of damaging the operability that the graphics for an operation is not displayed when needed. Therefore, there has been demanded a control method for displaying the operating graphics of GUI when needed while preventing the operating graphics from hindering other operations.

Solution to Problem

An advantage of some aspects of the invention is to appropriately display the operating graphics of GUI, which allows position input by an operation on the display having an image displayed, so as not to hinder the operation.

One aspect of the invention is directed to an image supply device used with an image display device adapted to display an image on a display surface and an operation detection device adapted to detect an indication location in accordance with a position indication operation on the display surface. The image supply device includes a drawing section adapted to generate a superimposition image to be displayed while being superimposed on an original image based on the indication location detected by the operation detection device, a first image generation section adapted to generate a first composite image by superimposing the superimposition image generated by the drawing section on the original image, a second image generation section adapted to generate a second composite image by superimposing an operating image for instructing a process of the superimposition image generated by the drawing section on the first composite image in response to a change in the original image, and an output section adapted to output the second composite image to the image display device.

According to the aspect of the invention, the superimposition image is generated in accordance with the operation to the display surface, and the superimposition image is displayed while being superimposed on the original display image, and further, if the change in the original display image occurs, the operating image for instructing the process of the superimposition image is displayed. Thus, when executing the function of generating and then displaying the image in accordance with the operation, the operating image for instructing the process of the image thus generated can be displayed when needed so as not to hinder the operation for generating the image.

The operating image capable of allowing instruction to store or erase the superimposition image generated by the operation to the display surface or the first composite image obtained by superimposing the superimposition image on the original image may be displayed when needed, and therefore the operation of erasing the image or the operation of storing the image can promptly be performed.

The operating image may be displayed in the vicinity of the operation location to thereby achieve enhancement of the convenience, and the operating image may be displayed at a place distant from the operation location so as not to hinder the operation, thus the enhancement of the operability can be achieved.

Another aspect of the invention is directed to an image display system including the image supply device described above, the image display device adapted to display an image output by the image supply device on a display surface, and the operation detection device adapted to detect an indication location in accordance with a position indication operation in the display surface.

According to the aspect of the invention, the superimposition image is generated in accordance with the operation to the display surface, and the superimposition image is displayed while being superimposed on the original display image, and further, if the change in the original display image occurs, the operating image for instructing the process of the superimposition image is displayed. Thus, when executing the function of generating and then displaying the image in accordance with the operation, the operating image for instructing the process of the image thus generated can be displayed when needed so as not to hinder the operation for generating the image.

The operating image may be displayed by a specific operation of an operating device, and therefore, in addition to the function of displaying the operating image in response to the change in the display image, the operating image can intentionally be called up by the operator when needed. Thus, further enhancement of the operability can be achieved reflecting the intention of the operator.

The image display system described above may be configured such that the image display device is provided with the operation detection device, and in this case, by detecting the operation to the display surface by the image display device, it is possible to reduce the number of devices in the vicinity of the screen SC to thereby enhance the installability, and further, the operation can more accurately be detected.

Still another aspect of the invention is directed to an image display device adapted to display an image on a display surface, including a drawing section adapted to generate a superimposition image to be displayed while being superimposed on an original image based on an indication location detected by an operation detection device adapted to detect the indication location in response to a position indication operation in the display surface, a first image generation section adapted to generate a first composite image by superimposing the superimposition image generated by the drawing section on the original image, a second image generation section adapted to generate a second composite image by superimposing an operating image for instructing a process of the superimposition image generated by the drawing section on the first composite image in response to a change in the original image, and a display section adapted to display the second composite image.

According to the aspect of the invention, the image display device generates the superimposition image in accordance with the operation to the display surface, and the superimposition image is displayed while being superimposed on the original display image, and further, if the change in the original display image occurs, the operating image for instructing the process of the superimposition image is displayed. Thus, when executing the function of generating and then displaying the image in accordance with the operation, the operating image for instructing the process of the image thus generated can be displayed when needed so as not to hinder the operation for generating the image.

Yet another aspect of the invention is directed to a method of controlling an image supply device used with an image display device adapted to display an image on a display surface and an operation detection device adapted to detect an indication location in accordance with a position indication operation on the display surface. The method includes obtaining a displaying image and outputting the displaying image to the image display device, generating a superimposition image to be displayed while being superimposed on an original image based on the indication location detected by the operation detection device, generating a first composite image by superimposing the superimposition image generated on the original image and then outputting the first composite image to the image display device, generating a second composite image by superimposing an operating image for instructing a process of the superimposition image generated on the first composite image in response to a change in the original image, and outputting the second composite image to the image display device.

By executing the control method of the aspect of the invention, the superimposition image is generated in accordance with the operation to the display surface, and the superimposition image is displayed while being superimposed on the original display image, and further, if the change in the original display image occurs, the operating image for instructing the process of the superimposition image is displayed. Thus, when executing the function of generating and then displaying the image in accordance with the operation, the operating image for instructing the process of the image thus generated can be displayed when needed so as not to hinder the operation for generating the image.

Still yet another aspect of the invention is directed to a computer readable recording medium used with an image display device adapted to display an image on a display surface and an operation detection device adapted to detect an indication location in accordance with a position indication operation on the display surface, and storing a program for making the computer function as a drawing section adapted to generate a superimposition image to be displayed while being superimposed on an original image based on the indication location detected by the operation detection device, a first image generation section adapted to generate a first composite image by superimposing the superimposition image generated by the drawing section on the original image, a second image generation section adapted to generate a second composite image by superimposing an operating image for instructing a process of the superimposition image generated by the drawing section on the first composite image in response to a change in the original image, and an output section adapted to output the second composite image to the image display device in a computer readable manner.

Advantageous Effects of Invention

According to the aspects of the invention, when executing the function of generating and then displaying the image in accordance with the operation, the operating image for instructing the process of the image thus generated can be displayed when needed so as not to hinder the operation for generating the image.

BRIEF DESCRIPTION OF DRAWINGS

FIG. 1 is a diagram showing a configuration of a display system according to an embodiment of the invention.

FIG. 2 is a diagram showing how an operation on a screen with a stylus device is performed.

FIG. 3 is a block diagram showing a functional configuration of the display system.

FIG. 4 illustrates diagrams showing how a menu bar is displayed on a screen and shows an example with no menu bar displayed, wherein (A) shows an example with no menu bar displayed, (B) shows an example with the displaying image changed, and (C) shows an example with the menu bar displayed.

FIG. 5 is a diagram showing a configuration example of an operating graphics.

FIG. 6 is a diagram showing another example of how an operating graphics is displayed.

FIG. 7 is a flowchart showing an operation of a display system.

DESCRIPTION OF EMBODIMENT

An embodiment to which the invention is applied will hereinafter be explained with reference to the accompanying drawings.

FIG. 1 is a diagram showing a configuration of a display system 10 according to the embodiment.

The display system 10 (an image display system) is configured including a projector 11 for projecting an image on a screen SC, and a personal computer (PC) 13 for transmitting the image to the projector 11. The projector 11 and the PC 13 are connected so as to be able to communicate with each other via a communication network 12, and further, a plurality of PCs 13 are connected to the communication network 12. Each of the PCs 13 is capable of executing a projector control program 13A for controlling the projector 11, and of individually controlling the projector 11, but the number of PCs 13 which can control the projector 11 simultaneously is one. Therefore, each of the PCs 13 can start the control of the projector 11 in the condition in which no other PC 13 is controlling the projector 11.

The communication network 12 is a LAN configured pursuant to, for example, the Ethernet (registered trademark) standard, but can be partially composed of a public network or an exclusive line to thereby have the PC 13 in a remote location connected thereto, and the specific configuration of the communication network 12 can arbitrarily be determined. Further, the number of the PCs 13 provided to the display system 10 is not particularly limited. Since the PCs 13 have substantially the same configurations, FIG. 1 shows a functional block with respect to one of the PCs 13.

The projector 11 functions as an image display device, and projects a displaying image 201, which is input from the PC 13, to the screen SC. Further, the projector 11 functions as an operation detection device, and when a stylus device 15 (pointing object) is operated on the screen SC, the projector 11 detects the operation location of the stylus device 15, and then transmits the location thus detected to the PC 13. In the display system 10, there is provided a function that when the stylus device 15 is operated on the screen SC, a drawing image 211 is drawn so as to follow the operation of the stylus device 15, and the drawing image 211 is projected on the screen SC while being superimposed on the displaying image 201 presently projected thereon. Thus, it is possible to draw a picture overlapping the displaying image 201, or to write characters and symbols in the displaying image 201 while executing a presentation using the displaying image 201. Further, the stylus device 15 is provided with a switch 15A, and the projector 11 displays a menu bar 221 (FIG. 4(C)) described later when detecting the operation of the switch 15A.

FIG. 2 is a diagram showing how the operation to the screen SC by the stylus device 15 is performed.

In the example shown in FIG. 2, the projector 11 is used in the condition in which a top surface section 2A provided with an opening section (not shown) for projecting an image is aimed downward, and is used while a bottom section 2B on the opposite side to the top surface section 2A is fixed to an arm 14 attached to a wall surface provided with the screen SC. The bottom surface section 2B is provided with a plurality of attachment sections, to which clasps to be coupled to the arm 14 can be attached, disposed at appropriate places, and is provided with a cable connection section (not shown) to which communication cables to be coupled to an external device such as PC 13, power supply cables of the projector 11, and so on are connected. These cables penetrate the arm 14, and are distributed in the ceiling and inside the wall surfaces of a room in which the display system 10 is installed. Further, the screen SC is not limited to a flat plate fixed to the wall surface, but it is also possible to use the wall surface itself as the screen SC.

An exterior housing 2 of the projector 11 is provided with a tilted surface 21A aimed toward the screen SC in the installation condition shown in FIG. 2, and a projection optical system 33 (FIG. 3) described later projects the projection light from the tilted surface 21A toward the screen SC. Therefore, as shown in FIG. 2, the screen SC is irradiated with the projection light from obliquely above, and the image is projected thereon.

Here, the operator who operates the stylus device 15 stands in front of the screen SC, and performs an operation of moving the stylus device 15 on the screen SC, or pointing a location on the screen SC with the stylus device 15. The stylus device 15 is provided with a light emitting section (not shown) for emitting infrared light, and the projector 11 has a function of receiving the infrared light emitted by the stylus device 15 to thereby detect the location of the stylus device 15 in the screen SC. Specifically, the stylus device 15 has a configuration provided with a light emitting window incorporating an infrared LED disposed on the side surface to thereby emit the infrared light from the light emitting window, and the projector 11 has an infrared light image taking section for detecting the infrared light disposed on the tilted surface 21A to thereby take the image of the screen SC from the tilted surface 21A. According to this configuration, the location of the stylus device 15 on the screen SC can be detected by the projector 11. The stylus device 15 may be pen-shaped, in the shape of a rod, or in other form.

Further, the projector 11 projects a predetermined image for adjustment on the screen SC prior to beginning of use of the stylus device 15 to allow the operation of sequentially pointing the points on the image for adjustment with the stylus device 15 to thereby perform calibration of the detected location.

Further, the stylus device 15 is provided with the switch 15A which can be operated by pressing disposed on the side surface, and if the operator holds down the switch 15A, an infrared signal representing the operation of the switch 15A is transmitted from the light emitting section of the stylus device 15. By the projector 11 receiving and then decoding the infrared signal, the projector 11 can detect the location pointed by the stylus device 15 and the operation of the switch 15A at that location. The projector 11 transmits the information representing the location thus detected and presence or absence of the operation of the switch 15A to the PC 13.

Based on the location information received from the projector 11, the PC 13 performs a process of, for example, performing drawing on the projection image at that location in an overlapping manner to thereby form a new projection image, and thus reflects the content of the position input operation to the projection image.

Further, as shown in FIG. 1, the PC 13 is provided with a CPU 131 for executing a basic control program to thereby control each part, and at the same time executing various application programs to thereby realize functions as an image supply device, a ROM 132 for storing the basic control program and so on executed by the CPU 131 in a nonvolatile manner, a RAM 133 for temporarily storing the programs executed by the CPU 131, the data processed by the CPU 131, and so on, a storage section 134 for storing the application programs executed by the CPU 131 and the data processed by the functions of the application programs, an input section 135 for detecting an input operation with an input device such as a keyboard or a mouse, and then outputting the data representing the operation content to the CPU 131, an output section 136 for outputting a processing result by the CPU 131 and so on to an output device such as a display or a printer, and a communication I/F 137 for executing communication with other PCs 13 and the projector 11 via the communication network 12.

The storage section 134 stores a projector control program 13A, which is the application program for controlling the projector 11 to project the image, and at the same time performing the process corresponding to the operation by the stylus device 15. Further, the storage section 134 stores display image data 13B to be projected by the projector 11. The display image data 13B includes still image data, moving image data, and combined data such as a presentation file including a plurality of still images, and further includes a file which can be reproduced by a specific application program. The PC 13 is capable of displaying the image on the display with the output section 136 using the display image data 13B, and at the same time transmitting the image the same as the image to be displayed to the projector 11, and is also capable of reproducing the display image data 13B and then transmitting the image only to the projector 11.

FIG. 3 is a block diagram showing a functional configuration of the display system 10.

The projector 11 is provided with an external I/F (interface) section 101 to be connected to external devices such as the PCs 13, a video playback device, or a DVD playback device. The external I/F section 101 is provided with, for example, an USB interface, a wired or wireless LAN interface, a VGA terminal to which an analog video signal is input, a Digital Visual Interface (DVI) to which a digital video signal is input, an S-video terminal to which a composite video signal such as NTSC, PAL, or SECAM is input, an RCA terminal to which a composite video signal is input, a D-terminal to which a composite video signal is input, and an HDMI connector compliant with the HDMI (registered trademark) standard. The projector 11 according to the present embodiment is connected to the communication network 12 via the LAN interface of the external I/F section 101.

The projector 11 is composed of an optical system for performing optical image formation and an image processing system for electrically processing the video signal in view of the general classification. The projection section 3 (projection section) as the optical system is composed of an illumination optical system 31, a liquid crystal panel 32 as a light modulation device, and a projection optical system 33. The illumination optical system 31 is provided with a light source formed of, for example, a xenon lamp, a super-high pressure mercury lamp, or a light emitting diode (LED). Further, the illumination optical system 31 can be provided with a reflector and an auxiliary reflector for guiding the light emitted by the light source to the liquid crystal panel 32, and can be a system provided with, for example, a lens group (not shown) for improving the optical characteristics of the projection light, a polarization plate, or a photochromic element for reducing the light intensity of the light emitted by the light source on the path reaching the liquid crystal panel 32.

The liquid crystal panel 32 receives the signal from the image processing system described later, and then forms the image on the panel surface. The liquid crystal panel 32 is composed of three liquid crystal panels corresponding respectively to three primary colors of RGB in order for performing color projection. Therefore, the light from the illumination optical system 31 is separated into colored lights of three colors of RGB, and the colored lights enter the corresponding liquid crystal panels, respectively. The colored lights modulated while passing through the respective liquid crystal panels are combined by a combining optical system such as a cross dichroic prism, and then output to the projection optical system 33.

The projection optical system 33 is provided with, for example, a zoom lens for performing expansion and contraction of the image to be projected and adjustment of the focus, a zoom controlling motor for controlling the level of the zoom, a focus adjusting motor for performing the focus adjustment, and a concave mirror for directing the projection light to the screen SC. The projection optical system 33 performs the zoom adjustment and the focus adjustment on the incident light modulated by the liquid crystal panel 32 through the zoom lens, then guides the light having passed through the zoom lens toward the screen SC with the concave mirror, and then focus the light on the screen SC. To this optical system, there are connected a projection optical system drive section 121 for driving the respective motors provided to the projection optical system 33 in accordance with the control of the control section 103, and a light source drive section 117 for driving the light source provided to the illumination optical system 31 in accordance with the control of the control section 103. It should be noted that the specific configuration of the projection optical system 33 is not limited to the example described above, and it is also possible to project and then focus the light, which is modulated by the liquid crystal panel 32, on the screen by a lens using a configuration without using a mirror including the concave mirror.

On the other hand, the image processing system is configured including the control section 103 for integrally controlling the whole of the projector 11 as a core component, and is provided with a storage section 105 storing data to be processed by the control section 103 and a program to be executed by the control section 103, an input processing section 123 for detecting an operation via an operation panel 23 and a remote control receiver 41, a display control section 107 for processing the input video input via the external I/F section 101, an image processing section 113 provided with a frame memory 115, and a light modulation device drive section 119 for driving the liquid crystal panel 32 based on the video signal output from the display control section 107 to thereby perform drawing.

The control section 103 reads out and executes a control program 105A stored in the storage section 105 to thereby control each section of the projector 11. The control section 103 detects the content of the operation performed by the operator based on the operation signal input from the input processing section 123, and then controls the display control section 107, the projection optical system drive section 121, and the light source drive section 117 in accordance with the operation to thereby project the video on the screen SC.

The exterior housing 2 of the projector 11 is provided with the operation panel 23 having various switches and indicator lamps. The operation panel 23 is connected to the input processing section 123, and the input processing section 123 appropriately lights or blinks the indicator lamps of the operation panel 23 in accordance with the operation state and the setting state of the projector 11 following the control of the control section 103. If the switch of the operation panel 23 is operated, the operation signal corresponding to the switch thus operated is output from the input processing section 123 to the control section 103.

Further, the projector 11 receives the light of the infrared signal, which is transmitted by the remote controller (not shown) used by the operator in accordance with the button operation, with the remote control receiver 41. The remote control receiver 41 decodes the infrared signal received from the remote controller to thereby generate the operation signal representing the operation content in the remote controller, and then outputs it to the control section 103.

The display control section 107 is connected to the external I/F section 101. The image processing section 113 connected to the display control section 107 develops the input video, which is input to the display control section 107 via the external I/F section 101, in the frame memory 115, then performs various conversion processes such as analog/digital conversion, interlace/progressive conversion, or resolution conversion if necessary to thereby generate the video signal with the format set in advance, and then outputs it to the display control section 107. The display control section 107 outputs the video signal processed by the image processing section 113 to the light modulation device drive section 119 to display it on the liquid crystal panel 32.

Further, the projector 11 is provided with an infrared light receiving section 42 for detecting the infrared light emitted by the stylus device 15 as described above. The infrared light receiving section 42 is specifically configured including an image taking element for taking the image of the infrared light of the screen SC, and an image taking circuit for outputting a taken image data obtained by the image taking element. The infrared light receiving section 42 takes the image of the screen SC at a predetermined period following the control of the control section 103, and then outputs the taken image data to the control section 103.

The control section 103 executes the control program 105A stored in the storage section 105 to thereby function as an operation detection section 102. Due to the function of the operation detection section 102, the projector 11 operates as the operation detection device. The control section 103 specify the indication location of the stylus device 15 on the screen SC based on the taken image data input from the infrared light receiving section 42 due to the function of the operation detection section 102. For example, an imaginary X-Y orthogonal coordinate system is set on the screen SC, and the operation detection section 102 performs a process of obtaining the X-coordinate and the Y-coordinate of the indication location based on the data input from the infrared light receiving section 42. Further, in the case of receiving the infrared signal emitted by the stylus device 15 in response to the operation of the switch 15A, the infrared light receiving section 42 outputs the operation data corresponding thereto to the operation detection section 102. The operation detection section 102 detects the operation of the switch 15A based on the data input from the infrared light receiving section 42. The operation detection section 102 transmits the data representing the indication location of the stylus device 15 and the operation condition of the switch 15A to the PC 13 via the external I/F section 101. Here, the PC 13 to be the destination is the PC 13 presently executing the projector control program 13A to thereby control the projector 11.

The PC 13 executes the projector control program 13A with the CPU 131 shown in FIG. 1 to thereby realize the function as an image output section 51 (output section), an output image generation section 52 (first image generation section), a superimposition image generation section 53 (drawing section), and a GUI control section 54 (second image generation section).

The PC 13 reproduces the display image data stored in the storage section 134, and then transmits the image to the projector 11 due to the function of the image output section 51. Further, the PC 13 detects the indication location of the stylus device 15 based on the data received from the projector 11 with the communication I/F 137, and then draws a line or a figure along the trajectory of the location thus detected due to the function of the superimposition image generation section 53. In other words, the image of the line or the figure is generated, the image (the superimposition image) thus generated is output to the superimposition image generation section 53. The output image generation section 52 superimposes the superimposition image generated by the superimposition image generation section 53 on the image (e.g., the image obtained by reproducing the display image data 13B) presently output to thereby combine the images, and then outputs the new image for display.

Further, the output image generation section 52 makes the image output section 51 transmit the new image for display thus generated to the projector 11.

Further, the PC 13 performs the control of displaying the menu bar 221 (FIG. 4(C)) on the screen SC due to the function of the GUI control section 54. The GUI control section 54 retrieves the image of the menu bar 221 from the storage section 134, then outputs it to the superimposition image generation section 53, and performs the control of superimposing the image of the menu bar 221 when generating the superimposition image and then outputting it to the output image generation section 52, and thus, outputs the image of the menu bar 221 to the output image generation section 52. The output image generation section 52 superimposes the superimposition image generated by the superimposition image generation section 53 and the image of the menu bar 221 obtained by the GUI control section 54 on the image presently output to thereby generate the new image for display, and then makes the image output section 51 transmit the image.

In the case in which the image to be displayed by the projector 11 is changed, the PC 13 of the present embodiment makes the GUI control section 54 display the menu bar 221. The case in which the image is changed refers to the case in which, for example, a slide to be displayed is changed while reproducing a file composed of a plurality of slides. The PC 13 compares the images transmitted from the image output section 51 to the projector 11 at time points with a predetermined time interval to thereby obtain the difference between the consecutive images, and determines that the image has changed if the difference exceeds a threshold level set in advance. Since the PC 13 transmits the image frame by frame at a predetermined frame rate irrespective of whether the image is a still image or a moving image, it results that the frames of the same image are continuously transmitted even in the case of the still image. Therefore, by obtaining the difference from the frame having been transmitted previously every time the frame is transmitted to the projector 11, the change in the image can promptly be detected. It should be noted that the frequency of the comparison can be once per several frames in order to reduce the load of the process for obtaining the difference.

(A), (B), and (C) in FIG. 4 are explanatory diagrams showing how the menu bar 221 is displayed on the screen SC, wherein (A) shows an example with the menu bar 221 not displayed, (B) shows an example with the displaying image changed, and (C) shows an example with the menu bar 221 displayed.

In the example shown in FIG. 4(A), a slide for education is displayed on the screen SC as the displaying image 201, and the drawing image 211 is displayed along the trajectory of the stylus device 15. The drawing image 211 is the superimposition image the superimposition image generation section 53 has generated by tracing the trajectory of the location of the stylus device 15 detected by the operation detection section 102.

Here, if the displaying image 201 presently projected on the screen SC is changed to the displaying image 202 shown in FIG. 4(B) by the operation with the operation panel 23 or the remote controller, the difference between the displaying image 201 and the displaying image 202 exceeds the threshold level. For example, in the displaying image 202 shown in FIG. 4(B), there appear lines not included in the displaying image 201 shown in FIG. 4(A). The displaying image 201 is an educational question, and the displaying image 202 is arranged to be an image showing the right answer as a successive image to the displaying image 201 for education.

The newly appeared lines in the displaying image 202, namely the difference parts, are the answer of the question. Since the difference between the displaying image 202 and the displaying image 201 exceeds the threshold level, the menu bar 221 is displayed so as to be superimposed on the displaying image 202 presently projected on the screen SC as shown in FIG. 4(C).

Here, the displaying image 201 corresponds to an original image, the image obtained by superimposing the drawing image 211 thus drawn on the displaying image 201 shown in (A) and (B) in FIG. 4 corresponds to a first composite image, and the image having the menu bar 221 displayed in a superimposed manner in (C) in FIG. 4 corresponds to a second composite image.

The menu bar 221 is an operating graphics (an operating image) having a plurality of buttons each assigned with a specific function arranged, and if an operation of designating each of the buttons of the menu bar 221 with the stylus device 15 is performed, the PC 13 executes the process corresponding to the button thus operated. The PC 13 makes the projector 11 display the menu bar 221 due to the function of the GUI control section 54. Therefore, the data of the menu bar 221 such as the display location, the size, and the types of the buttons thus arranged are held due to the function of the GUI control section 54, and it is possible to identify the button corresponding to the operation location of the stylus device 15 to thereby make the CPU 131 execute the operation corresponding to the button.

FIG. 5 is a diagram showing a configuration example of the menu bar 221 as one example of the operating graphics.

In the example shown in FIG. 5, in the menu bar 221 there is arranged a plurality of buttons including drawing buttons 231, drawing setting buttons 232, an eraser button 233, UNDO/REDO buttons 234, a selection start button 235, a magnification button 236, an all erasure button 241, and a screen capture button 242. The drawing button 231 and the drawing setting buttons 232 are buttons for setting the thickness of a line, the color of the line, the shapes of the ends of the line, and so on in the case of performing drawing in accordance with the operation of the stylus device 15. The eraser button 233 is a button for instructing start of a so-called eraser function of erasing a designated part of the line, symbol, or the like having already been drawn in accordance with the operation of the stylus device 15. The UNDO/REDO buttons 234 are buttons for instructing cancel of the action having been executed most recently and re-execution of the action. The selection start button 235 is a button for instructing start of an action for selecting a part or the whole of the line, the symbol, or the like having already been drawn in accordance with the operation of the stylus device 15, and the magnification button 236 is a button for instructing magnified display of a part or the whole of the line, the symbol, or the like having already drawn in accordance with the operation of the stylus device 15.

Further, the all erasure button 241 is a button for instructing erasure of all of the line, the symbol, and so on having already been drawn in accordance with the operation of the stylus device 15, and the screen capture button 242 is a button for instructing storage of the line, the symbol, and so on having already drawn in accordance with the operation of the stylus device 15. In accordance with the operation of the screen capture button 242, the drawing image 211 on the screen SC is captured together with the displaying image 201, 202 projected on the screen SC as a background, and these images are stored in the storage section 134 of the PC 13 as a single image.

Here, it is possible for the PC 13 to store the drawing image 211 alone as the image or to store the drawing image 211 and the displaying image 201, 202 with a data format capable of separating these images from each other. Further, the data thus captured is stored in the storage section 134 so that the projector 11 can project the drawing image 211 again together with the displaying image 201, 202.

As described above, the menu bar 221 is an operating graphics having the buttons for instructing processes of the drawing image 211 as the superimposition image drawn in accordance with the operation of the stylus device 15 in a consolidated manner. As shown in (A) and (B) in FIG. 4, in the case in which the image changes from the displaying image 201 to the displaying image 202, it is conceivable that the operator who operates the stylus device 15 erases the drawing image 211 having already been drawn or redraws it after the erasure. On this occasion, in order to store and erase the drawing image 211 and to make the condition allowing redrawing of the drawing image 211, it becomes necessary for the operator to display the menu bar 221. Therefore, by displaying the menu bar 221 at the timing when the displaying image changes, there can be obtained an advantage that the convenience is enhanced. Further, since the possibility of processing the drawing image 211 is not so high during the period in which no change in the displaying image occurs, there is a possibility that the display of the menu bar 221 hinders the drawing. Therefore, by displaying the menu bar 221 in response to change in the displaying image, the menu bar 221 appears when needed without causing hindrance in the normal operation. Therefore, further improvement in convenience can be achieved.

The menu bar 221 is an operating graphics having the operation buttons of a plurality of functions related to the drawing operations by the operation of the stylus device 15, or all of the functions executable under the control of the PC 13 arranged. In other words, the menu bar 221 is an operating graphics for instructing all or a number of processes, which the PC 13 can execute, and which are related to performing drawing, editing, erasure, and storage of the content of the drawing, in accordance with the operation of the stylus device 15. In contrast thereto, it is also possible to adopt the configuration of displaying an operating graphics for instructing only some of the processes related to drawing which the PC 13 can execute in accordance with the operation of the stylus device 15.

FIG. 6 is a diagram showing another example of the menu bar 221 as one example of the operating graphics.

In the example shown in FIG. 6, unlike the menu bar 221 having a plurality of buttons, a menu image 223 having the screen capture button arranged alone and a menu image 225 having the all erasure button arranged alone are displayed. The processes instructed by the menu images 223, 225 are only some of the processes related to drawing the PC 13 can execute, and are the buttons for instructing the screen capture (storage) and the all erasure (erasure) which are the processes having a particularly high execution frequency. In other words, the menu images 223, 225 are the operating graphics respectively corresponding to the functions included in the plurality of functions supported by the menu bar 221. Further, it can also be said that the menu images 223, 225 are the operating graphics for instructing the processes on the entire projection area of the screen SC as the drawing area out of the processes the PC 13 can execute. Further, in the case in which drawing is performed in accordance with the operation of the stylus device 15, and then drawing is newly started after switching to the subsequent displaying image, there is performed an action of executing the screen capture for storing the entire projection area in the condition in which the drawing is performed once, and then erasing all of the drawing content by the all erasure. From this point of view, it can be said that the menu images 223, 225 are the operating graphics for instructing the processes (functions) necessary when terminating the drawing and then newly starting drawing.

Since these menu images 223, 225 each have one button, there is obtained an advantage that they do not hinder the operation of the stylus device 15. It is also possible for the GUI control section 54 (FIG. 3) to display only the menu images 223, 225 while being superimposed on the displaying image and the superimposition image if the change in the displaying image to be displayed on the screen SC exceeds the threshold level.

Further, the position at which the GUI control section 54 display the menu bar 221 is arbitrary, and it is possible to set it to the initial position (a prescribed position) at the right end on the screen SC as shown in FIG. 6, or to display it in the vicinity of the stylus device 15. However, taking the prevention of hindrance of the operation of the stylus device 15 as described above into consideration, it is preferable to select the small-sized operating graphics such as the menu images 223, 225 as those displayed in the vicinity of the stylus device 15. On this occasion, it is also possible to combine the menu images 223, 225 and the menu bar 221 with each other to thereby display them simultaneously as shown in FIG. 6. Further, it is also possible to display at least one of the menu images 223, 225 without displaying the menu bar 221. Further, although the menu images 223, 225 each correspond to only a single function in FIG. 6, the menu images 223, 225 can be those each corresponding to two or more functions.

FIG. 7 is a flowchart showing an operation of the display system 10, and in particular, showing an operation of the PC 13.

Firstly, if the start of a position input mode is instructed by the operation of the remote control device or the operation panel 23 in the projector 11 or the operation detected by the input section 135 of the PC 13, the CPU 131 executes the projector control program 13A to thereby start (step S11) the operation of the position input mode.

Subsequently, the CPU 131 executes (step S12) the calibration. In the calibration, an image for the calibration is transmitted to the projector 11, or the projector 11 retrieves the image for the calibration from the storage section 105, and then the projector 11 projects the image. The operation of the stylus device 15 with respect to the image for the calibration is detected, and the location thus detected and the data for the calibration are compared to each other to thereby perform the calibration.

Subsequently, the CPU 131 obtains (step S13) the display image data 13B from the storage section 134, then reproduces the display image data 13B, and then starts (step S14) the transmission (output) of the displaying image by the image output section 51. Further, the CPU 131 starts (step S15) detection of the variation (difference between the frames) in the image obtained by the image output section 51 and then transmitted to the projector 11 simultaneously with the start of transmission of the displaying image.

The CPU 131 obtains (step S16) the indication location of the stylus device 15 based on the data transmitted by the projector 11, and then generates (step S17) the drawing image due to the function of the superimposition image generation section 53 so as to trace the trajectory of the location thus obtained. Then, the new displaying image is generated by superimposing the drawing image on the displaying image due to the function of the output image generation section 52, and then the image output section 51 transmits (step S18) the new displaying image to the projector 11. Thus, the image projected by the projector 11 on the screen SC is updated.

The CPU 131 determines (step S19) whether or not the variation exceeding the threshold level has been caused in the image obtained by the image output section 51, and if the variation has been caused, the GUI control section 54 generates the displaying image for displaying the menu bar 221, and the image output section 51 outputs the displaying image to the projector 11 to thereby project (step S20) the image on the screen SC.

Further, even in the case of determining that no variation is caused (No in the step S19), if the data representing the operation of the switch 15A is received from the projector 11 (Yes in the step S21), the process proceeds to the step S20, and the image including the menu bar is projected. After displaying the image including the menu bar, the CPU 131 determines (step S22) whether or not the position input mode is continued, and the process returns to the step S16 if it is continued (No in the step S22). Further, if no variation is caused in the image (No in the step S19) and no operation of the switch 15A occurs (No in the step S21), the CPU 131 moves the process to the step S22.

As described above, since the display system 10 according to the embodiment to which the invention is applied is provided with the PC 13 for outputting an image, and the projector 11 having the function as the image display device for projecting the image output by the PC 13 on the screen SC and the operation detection section 102 for detecting the indication location in accordance with the position indication operation in the screen SC, and the PC is provided with the image output section 51 for obtaining the displaying image and then outputting it to the projector 11, the superimposition image generation section 53 for generating the superimposition image to be displayed while being superimposed on the displaying image based on the indication location detected by the operation detection section 102, the output image generation section 52 for newly generating the displaying image by superimposing the superimposition image generated by the superimposition image generation section 53 on the displaying image, and then making the image output section 51 output the displaying image newly generated, and the GUI control section 54 for superimposing the operating graphics for instructing a process of the superimposition image generated by the superimposition image generation section 53 on the new displaying image generated by the output image generation section 52 and then making the image output section 51 output the image thus superimposed in response to the change in the image on which the output image generation section 52 has performed the superimposition, the superimposition image such as the drawing image 211 is generated in accordance with the operation to the screen SC, and the superimposition image is displayed while being superimposed on the displaying image 201, 202 as the original display image, and further, if the change in the original display image occurs, the operating graphics for instructing the process of the superimposition image is displayed. Thus, when executing the function of generating and then displaying the superimposition image in accordance with the operation of the stylus device 15, the operating graphics for instructing the process of the image thus generated can be displayed when needed so as not to hinder the operation for generating the image. In other words, since the operating graphics is displayed in the case in which the operator who operates the stylus device 15 needs the process of the superimposition image thus drawn, the operation is prevented from being hindered by unwanted display of the operating graphics, and thus, enhancement of the convenience can be achieved.

Further, the display system 10 is provided with the stylus device 15 capable of position indication operation to the screen SC and the pressing operation of the switch 15A besides the position indication operation, the operation detection section 102 detects the operation of the switch 15A while detecting the location indicated by the position indication operation of the stylus device 15, and the GUI control section 54 of the PC 13 displays the operating graphics if the operation detection section 102 detects the operation of the switch 15A. Therefore, in addition to the function of displaying the operating graphics, the operating graphics can be called up by the operator intentionally operating the switch 15A when needed. Thus, further enhancement of the operability can be achieved reflecting the intention of the operator.

Further, since the projector 11 is provided with the operation detection section 102, and is thus provided with the configuration of detecting the operation to the screen SC, it is possible to reduce the number of devices in the vicinity of the screen SC to thereby enhance the installability, and further, the operation can more accurately be detected.

Further, the PC 13 makes the menu bar 221, the menu image 223, or the menu image 225 including the button instructing at least one of the erasure process and the storage process of the superimposition image generated by the superimposition image generation section 53 be projected as the operating graphics. Therefore, the operation of erasing the image and the operation of storing the image can promptly be performed.

Since the PC 13 determines the display location of the operating graphics based on the indication location of the stylus device 15 due to the function of the GUI control section 54, it is possible to display the operating graphics in the vicinity of the operation location of the stylus device 15 to thereby achieve enhancement of the convenience, and further, it is also possible to display the operating graphics at a place distant from the operation location so as not to hinder the operation, thus enhancement of the operability can be achieved.

It should be noted that the embodiment described above is nothing more than an example of a specific aspect to which the invention is applied, and therefore, does not limit the invention. Therefore, it is also possible to apply the invention as an aspect different from the embodiment described above. For example, although in the embodiment described above, the explanation is presented citing the configuration in which the projector 11 detects the location indicated by the stylus device 15, determines the instruction state, and then transmits the information representing the result to the PC 13 due to the function of the operation detection section 102 as an example, the invention is not limited thereto, but it is also possible to adopt the configuration in which an infrared receiving section 42 is provided, the detection device for executing the function of the operation detection section 102 is configured as a separate device from the projector 11, and is connected to the projector 11 or the PC 13.

Further, although in the embodiment described above based on the location of the stylus device 15 detected by the projector 11, the PC 13 generates the drawing image due to the function of the superimposition image generation section 53, and performs the process of superimposing it on the display image due to the function of the output image generation section 52, and the process of generating the operating graphics due to the function of the GUI control section 54 and then superimposing it on the display image due to the function of the output image generation section 52, it is also possible for the projector 11 to execute the functions of the output image generation section 52, the superimposition image generation section 53, and the GUI control section 54. In this case, the projector itself stores the program for executing the processes described above in the storage section 105, and then the control section 103 executes the program, thereby realizing the functions described above.

Further, although in the embodiment described above the explanation is presented citing, as an example, the configuration of using the liquid crystal panel 32 composed of the three transmissive or reflective liquid crystal panels corresponding to the respective colors of RGB as means for modulating the light emitted by the light source, the invention is not limited thereto, but can be configured using a system including one liquid crystal panel and a color wheel combined with each other, a system using three digital mirror devices (DMD), a DMD system using one digital mirror device and a color wheel combined with each other, and so on. Here, in the case of using just one liquid crystal panel or DMD as the light modulation device, the member corresponding to the combining optical system such as the cross dichroic prism is unnecessary. Further, besides the liquid crystal panel or the DMD, any configuration capable of modulating the light emitted from the light source can be adopted without problems.

Further, the image display device according to the invention is not limited to the projector for projecting the videos to the screen SC, but various display devices including a liquid crystal monitor or a liquid crystal television set for displaying images/videos on a liquid crystal panel, a monitor device or a television receiver for displaying images/videos on a plasma display panel (PDP), a light emitting display device such as a monitor device or the television receiver for displaying images/videos on an organic EL display panel called an organic light-emitting diode (OLED), an organic electroluminescence (OEL), and so on can also be included in the image display device according to the invention.

Further, the pointing object may be a device other than the stylus device 15, a finger (or fingers) of the operator, or etc.

Further, each of the functional sections of the display system 10 shown in FIGS. 1 and 3 is for showing the functional configuration thereof, and the specific mounting forms are not particularly limited. It is not necessarily required to install the hardware corresponding individually to each of the functional sections, but it is obviously possible to adopt the configuration of realizing the functions of the plurality of functional sections by a single processor executing the program.

Although the explanation is presented citing the configuration in which the PC 13 executes the projector control program 13A with the CPU 131, and the projector 11 executes the control program 105A of the storage section 105 with the control section 103, it is also possible that the projector control program 13A or the control program 105A is downloaded from another device connected via the communication network 12 and then executed, or it is also possible to adopt the configuration of recording the projector control program 13A or the control program 105A on a portable recording medium, then retrieving the program from the recording medium, and then executing the program.

Further, a part of the function realized by software in the embodiments described above can also be realized by hardware, or a part of the function realized by hardware can also be realized by software. Besides the above, the specific detailed configuration of each of the sections of the display system 10 can arbitrarily be modified within the scope or the spirit of the invention.

REFERENCE SIGNS LIST

10 Display system (image display system)
11 Projector (image display device, operation detection device)
12 Communication network
13 PC (image supply device)
13A Projector control program
15 Stylus device (operating device)
15A Switch
42 Infrared light receiving section
51 Image output section (output section)
52 Output image generation section (first image generation section)
53 Superimposition image generation section (drawing section)
54 GUI control section (second image generation section)
101 External I/F section
102 Operation detection section
103 Control section
105 Storage section
105A Control program
131 CPU
201, 202 Displaying image
211 Drawing image
221 Menu bar (operating graphics)
223, 225 Menu image (operating graphics)
SC Screen (projection surface)

The invention claimed is:

1. An image supply device used with an image display device adapted to display an image on a display surface and an operation detection device adapted to detect an indication location in accordance with a position indication operation on the display surface, comprising:
    a drawing section adapted to generate a superimposition image to be displayed while being superimposed on an original image, the superimposition image being generated along a trajectory of the indication location detected by the operation detection device, the generation along the trajectory occurring using a trace line and based upon a response to a user action;
    a first image generation section adapted to generate a first composite image by superimposing the superimposition image generated by the drawing section on a first original image;
    a second image generation section adapted to generate a second composite image by superimposing an operating image and the superimposition image on a second original image, the second composite image being generated in response to a change of the original image from the first original image to the second original image, the operating image being used for instructing erasing the superimposition image, the second image generation section displaying the operating image when a difference between the first original image and the second original image exceeds a threshold level; and
    an output section adapted to output the second composite image to the image display device,
    wherein the image supply device reproduces a file including a plurality of slides, and the first original image and the second original image correspond to slides of the plurality of slides included in the file.

2. The image supply device according to claim 1, wherein the operating image includes a button for instructing at least one of an erasure process and a storage process of one of the superimposition image generated by the drawing section and the first composite image generated by the first image generation section.

3. The image supply device according to claim 1, wherein the second image generation section determines a display location of the operating image based on an indication location detected by the operation detection device.

4. An image display system comprising:
    the image supply device according to claim 1;
    the image display device adapted to display an image output by the image supply device on a display surface; and
    the operation detection device adapted to detect an indication location in accordance with a position indication operation in the display surface.

5. The image display system according to claim 4, wherein
    an operating device capable of a position indication operation to the display surface and a specific operation other than the position indication operation is provided,
    the operation detection device detects the specific operation by the operating device while detecting a location indicated by the position indication operation of the operating device, and
    the second image generation section of the image supply device displays the operating image in response to the operation detection device detecting the specific operation by the operating device.

6. The image display system according to claim 4, wherein
    the image display device is provided with the operation detection device.

7. An image display device adapted to display an image on a display surface comprising:
    a drawing section adapted to generate a superimposition image to be displayed while being superimposed on an original image, the superimposition image being generated along a trajectory of an indication location detected by an operation detection device adapted to detect the indication location in response to a position indication operation in the display surface, the generation along the trajectory occurring using a trace line and based upon a response to a user action;
    a first image generation section adapted to generate a first composite image by superimposing the superimposition image generated by the drawing section on a first original image;
    a second image generation section adapted to generate a second composite image by superimposing an operating image and the superimposition image on a second original image, the second composite image being generated in response to a change of the original image from the first original image to the second original image, the operating image being used for instructing erasing the superimposition image, the second image generation section displaying the operating image when a difference between the first original image and the second original image exceeds a threshold level; and a display section adapted to display the second composite image, wherein the image supply device reproduces a file including a plurality of slides, and the first original image and the second original image correspond to slides of plurality of slides included in the file.

8. The image display device according to claim 7, wherein the operating image includes a button for instructing at least one of an erasure process and a storage process of one of the superimposition image generated by the drawing section and the first composite image generated by the first image generation section.

9. The image display device according to claim 7, wherein the second image generation section determines a display location of the operating image based on an indication location detected by the operation detection device.

10. The image display device according to claim 7, wherein the operation detection device detects a specific operation by an operating device capable of a position indication operation to the display surface and the specific operation other than the position indication operation while detecting the location indicated by the position indication operation by the operating device, and the second image generation section displays the operating image in response to the operation detection device detecting the specific operation by the operating device.

11. A method of controlling an image supply device used with an image display device adapted to display an image on a display surface and an operation detection device adapted to detect an indication location in accordance with a position indication operation on the display surface, the method comprising:

obtaining a displaying image and outputting the displaying image to the image display device;

generating a superimposition image to be displayed while being superimposed on an original image, the superimposition image being generated along a trajectory of the indication location detected by the operation detection device, the generation along the trajectory occurring using a trace line and based upon a response to a user action;

generating a first composite image by superimposing the superimposition image generated on a first original image and then outputting the first composite image to the image display device;

generating a second composite image by superimposing an operating image and the superimposition image on a second original image, the second composite image being generated in response to a change of the original image from the first original image to the second original image, the operating image being used for instructing erasing the superimposition image, the operating image being displayed when a difference between the first original image and the second original image exceeds a threshold level;

outputting the second composite image to the image display device; and reproducing a file including a plurality of slides, and the first original image and the second original image correspond to slides of the plurality of slides included in the file.

12. The image supply device according to claim 1, wherein the operating image is used for instructing erasure of the superimposition image.

13. The image display device according to claim 7, wherein the operating image is used for instructing erasure of the superimposition image.

14. The method according to claim 11, wherein the operating image is used for instructing erasure of the superimposition image.

15. The image supply device according to claim 1, wherein the second composite image is shown as a successive image to the first composite image.

16. The image display device according to claim 7, wherein the second composite image is shown as a successive image to the first composite image.

17. The method according to claim 11, wherein the second composite image is shown as a successive image to the first composite image.

* * * * *